United States Patent
Yamaki

(10) Patent No.: US 9,426,746 B2
(45) Date of Patent: Aug. 23, 2016

(54) COMMUNICATION APPARATUS AND CONTROL METHOD THEREFOR

(71) Applicant: CANON KABUSHIKI KAISHA, Tokyo (JP)

(72) Inventor: Tomokazu Yamaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 13/857,291

(22) Filed: Apr. 5, 2013

(65) Prior Publication Data

US 2013/0322314 A1 Dec. 5, 2013

(30) Foreign Application Priority Data

May 31, 2012 (JP) ................................. 2012-125146

(51) Int. Cl.
*H04W 52/02* (2009.01)

(52) U.S. Cl.
CPC ..... *H04W 52/0241* (2013.01); *H04W 52/0238* (2013.01); *H04W 52/0212* (2013.01)

(58) Field of Classification Search
USPC .......................................... 370/311; 455/420
See application file for complete search history.

(56) References Cited

U.S. PATENT DOCUMENTS

| 2005/0009512 A1* | 1/2005 | Rue | H04L 12/12 455/420 |
|---|---|---|---|
| 2007/0297438 A1* | 12/2007 | Meylan | H04W 52/0225 370/445 |
| 2010/0189021 A1* | 7/2010 | He | H04W 52/00 370/311 |
| 2012/0176949 A1* | 7/2012 | Meylan | H04W 52/0225 370/311 |
| 2013/0155925 A1* | 6/2013 | Priyantha | H04W 52/0261 370/311 |
| 2014/0177501 A1* | 6/2014 | Seok | H04W 52/0216 370/311 |

FOREIGN PATENT DOCUMENTS

| JP | 2006-310909 A | 11/2006 | |
| JP | 2009-206762 | 9/2009 | ............ H04W 24/10 |
| JP | 2010-263549 | 11/2010 | ............ H04W 52/02 |

OTHER PUBLICATIONS

JP Office Action—JP Application No. 2012-125146, dated Apr. 4, 2016.

* cited by examiner

*Primary Examiner* — Andrew Lai
*Assistant Examiner* — Jamaal Henson
(74) *Attorney, Agent, or Firm* — Fitzpatrick, Cella, Harper & Scinto

(57) ABSTRACT

An operating state of a communication unit of a communication apparatus is kept for a keep period in accordance with a transmission cycle of control information transmitted by another communication apparatus. The communication apparatus wirelessly communicates with the other communication apparatus in the operating state. If the keep period elapses, the communication unit is switched from the operating state to a hibernation state. The communication apparatus does not communicate with the other communication apparatus in the hibernation state.

9 Claims, 6 Drawing Sheets

COMMUNICATION APPARATUS AND CONTROL METHOD THEREFOR

BACKGROUND OF THE INVENTION

1. Field of the Invention

The present invention relates to a communication apparatus for wireless communication.

2. Description of the Related Art

In recent years, products incorporating a wireless communication function represented by a wireless local area network (to be referred to as a "wireless LAN" hereinafter) complying with the IEEE802.11 series have become widespread. Examples of such products incorporating a wireless LAN are portable devices such as a camera and a personal digital assistant (PDA). Many portable devices are driven by a battery, and thus suppression of power consumption is an important issue for these devices.

The IEEE802.11 specification defines a power saving mode (power saving enabled) in addition to a normal mode (power saving disabled) in which a wireless LAN interface is always enabled. In the power saving mode, an intermittent process of transmitting/receiving data only under a specific condition achieves low power consumption by switching between enabling (Awake state) and disabling (Doze state) of the wireless LAN interface.

The IEEE802.11 specification defines that an apparatus receives data if there is reception data, but does not define how long the Awake state should be kept. If the Awake state is kept for a long time, it is possible to prevent a data loss or a decrease in throughput but the power consumption increases. To solve this problem, Japanese Patent Laid-Open No. 2006-310909 (literature 1) proposes the following technique.

Literature 1 discloses a control method for power saving in an infrastructure mode in which an apparatus communicates with another communication apparatus (station) via the base station (access point (AP)) of a wireless LAN. That is, according to the IEEE802.11 standard, a wireless LAN terminal in the power saving mode transits to the Awake state to receive a beacon as periodic control information of the wireless LAN from the AP. The time difference between the time when a beacon is actually received and the time when the beacon should be received from the AP is calculated, thereby estimating a beacon arriving delay time (to be referred to as a "beacon delay time" hereinafter) using the time difference. An Awake time determination unit determines an Awake state period using the beacon delay time.

The invention described in literature 1 does not consider a loss of data other than a beacon as control information. To prevent a loss of data other than a beacon, the apparatus may be kept in the Awake state for a predetermined time. A power saving effect may or may not be obtained depending on the predetermined time and a beacon interval.

A case in which a power saving effect is obtained and a case in which no power saving effect is obtained will be described with reference to FIGS. 1A and 1B, respectively. Referring to FIGS. 1A and 1B, a time during which the apparatus is kept in the Awake state to prevent a data loss is 80 ms.

According to the IEEE802.11 standard, a communication apparatus (STA) transits to the Awake state to receive a beacon from an AP, and receives a beacon. The beacon includes a TIM (traffic indication message) field indicating whether data to the STA has been buffered in the AP. The STA refers to the TIM field. If the STA recognizes that data to itself has not been buffered, it transits to the Doze state.

After a predetermined time (a time corresponding to the beacon interval) elapses, the STA transits to the Awake state again, and then receives a beacon from the AP. If the TIM filed indicates that data to the STA has been buffered in the AP (which is denoted by a reference numeral 601 in FIGS. 1A and 1B), the STA transmits a PS-Poll frame 602 to the AP, and then receives data 603 from the AP. The STA attempts to transit to the Doze state about 80 ms (the predetermined time) after the beacon is received.

In FIG. 1A, the beacon interval is 100 ms. After receiving the data 603, the STA can transit to the Doze state, thereby reducing the power consumption until a next beacon is received. On the other hand, the beacon interval is 80 ms in FIG. 1B. If the data 603 is received, the STA cannot transit to the Doze state, and remains in the Awake state to receive the next beacon, thereby disabling to suppress the power consumption. That is, a beacon transmission cycle may be different for each AP. The invention described in literature 1, however, does not consider that point.

Transiting to the Doze state after the predetermined time elapses may cause a decrease in throughput or a data loss if there is data to be received or transmitted.

SUMMARY OF THE INVENTION

In one aspect, a communication apparatus comprising: a communication unit configured to wirelessly communicate with another communication apparatus; and a switching unit configured to switch a state of the communication unit between an operating state and a hibernation state, wherein the communication apparatus communicates the other communication apparatus in the operating state, and the communication apparatus does not communicate with the other communication apparatus in the hibernation state, wherein the switching unit keeps the operating state for a keep period in accordance with a transmission cycle of control information transmitted by the other communication apparatus, and switches, if the keep period elapses, the communication unit from the operating state to the hibernation state.

According to the aspect, it is possible to prevent a decrease in throughput or a data loss while suppressing power consumption by a power saving mode.

Further features of the present invention will become apparent from the following description of exemplary embodiments with reference to the attached drawings.

DESCRIPTION OF THE EMBODIMENTS

A communication apparatus and a control method therefor according to an embodiment of the present invention will be described in detail below with reference to the accompanying drawings. Note that a case in which a wireless local area network (wireless LAN) complying with the IEEE802.11 standard is used will be explained below. A communication mode to which the present invention is applicable, however, is not limited to the wireless LAN or infrastructure mode, and various modifications can be made within the scope of the technical idea.

In the following embodiment, the communication apparatus can operate in a power saving mode. In the power saving mode, an intermittent process of transmitting/receiving data only under a specific condition switches between enabling (Awake state) and disabling (Doze state) of the operating state of a wireless communication interface. In the Awake state, the wireless communication interface is in the operating state, and can transmit/receive data via the wireless LAN. In the Doze state, the wireless communication interface is in a power saving state as a hibernation state, and cannot transmit/receive data via the wireless LAN.

[Arrangement of Apparatus]

Figure 1:
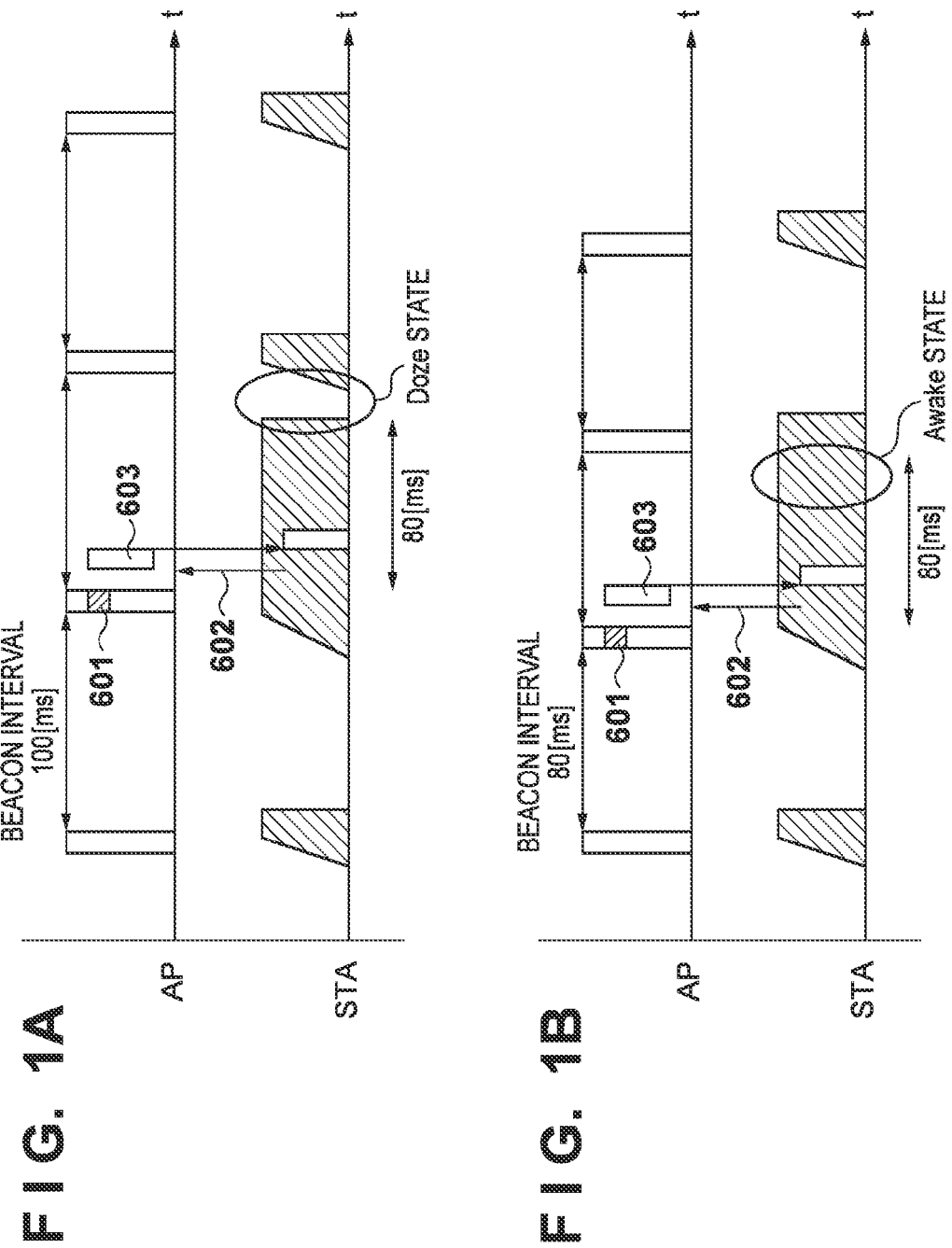
FIGS. 1A and 1B are timing charts for respectively explaining a case in which a power saving effect is obtained and a case in which no power saving effect is obtained.
Figure 2:
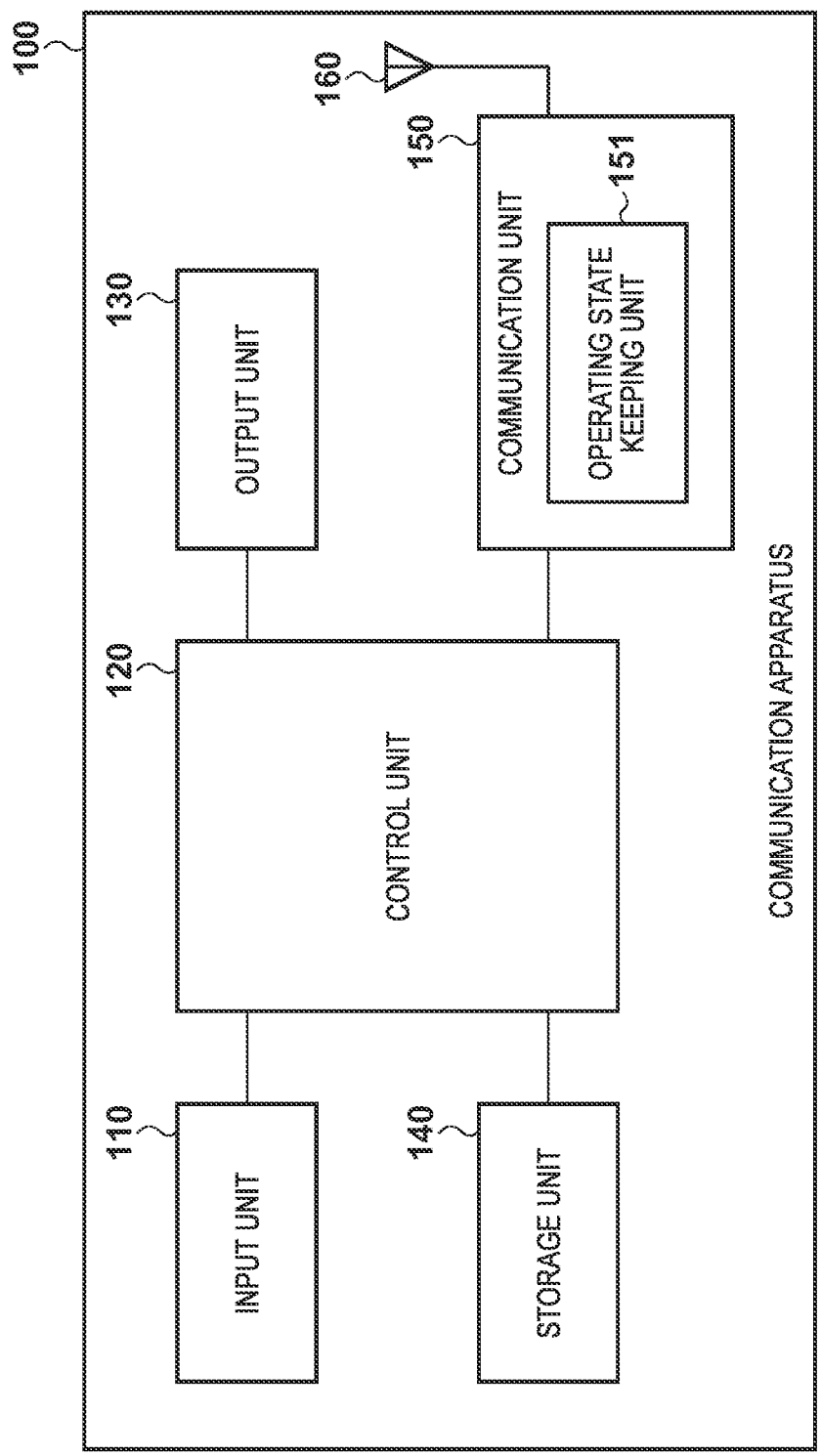
FIG. 2 is a block diagram showing the arrangement of a communication apparatus according to an embodiment.

FIG. 2 is a block diagram showing the arrangement of a communication apparatus 100 according to the embodiment.

The communication apparatus 100 has a function of executing the power saving mode in which the Awake state and Doze state of a communication unit 150 are switched and the operating state is switched in synchronism with the transmission cycle of control information transmitted by a communication partner apparatus (to be referred to as a "partner apparatus" hereinafter), thereby performing communication via the wireless LAN.

An input unit 110 which accepts various inputs from the user has a function of accepting settings associated with the wireless LAN. A control unit 120 controls various blocks, sets the communication unit 150 using communication parameters saved in a storage unit 140, and transmits/receives data to/from another apparatus via the communication unit 150 and an antenna 160, thereby performing connection processing with the wireless LAN.

An output unit 130 presents various kinds of information to the user through display using a liquid crystal panel or light emitting diode (LED), or audio output using a loudspeaker or the like. The output unit 130 also presents, for example, the settings associated with the wireless LAN, which have been accepted by the input unit 110. The storage unit 140 serves as a memory for storing programs to be executed by the control unit 120 and various kinds of information such as communication parameters.

The communication unit 150 communicates with another device via the wireless LAN, and executes processing associated with communication such as media access control (MAC) for control information and data received via the antenna 160. In this embodiment, the control information is a beacon transmitted by an access point (AP) or the like. Depending on a beacon cycle or a communication state with the partner apparatus, an operating state keeping unit 151 of the communication unit 150 controls the state of the communication unit 150 to keep the Awake state and not to transit to the Doze state.

The IEEE802.11 specification defines that a communication apparatus receives data if there is reception data, but does not define how long the Awake state should be kept. In this embodiment, the Awake state of the communication unit 150 is kept for a period corresponding to a predetermined percentage of the beacon cycle or depending on the communication state with another apparatus. Information indicating the beacon cycle is acquired from the control information or a probe response to a probe request defined by the IEEE802.11 standard. Note that a cycle in which the communication unit 150 actually receives the control information may be measured, thereby setting a measurement value as a beacon cycle.

[State Switching Operation]

Case in which Awake State is Kept During Keep Period

Figure 3:
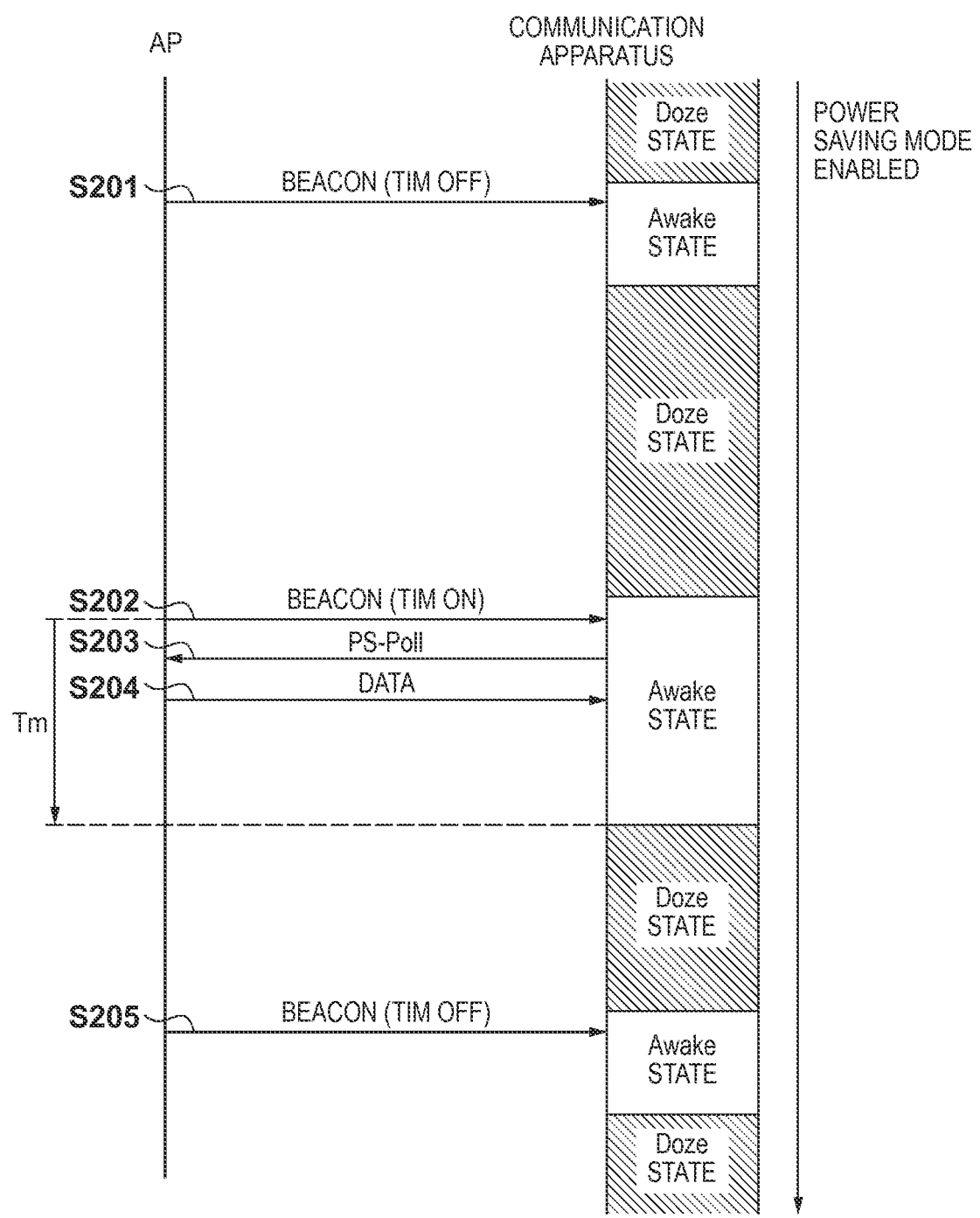
FIG. 3 is a sequence chart showing an example of a communication sequence by the communication apparatus in the infrastructure mode.

FIG. 3 shows an example of a communication sequence by the communication apparatus 100 in the infrastructure mode when the partner apparatus serves as an AP. Note that FIG. 3 shows an operation in which after the communication apparatus 100 connects a network formed by the AP, and transits to the power saving mode, the Awake state is kept in receiving data until a period (to be referred to as a "keep period Tm" hereinafter) corresponding to a predetermined percentage of the beacon cycle elapses.

The communication unit 150 of the communication apparatus 100 operating in the power saving mode periodically transits to the Awake state at a beacon reception timing, and receives a beacon from the AP via the antenna 160 (S201). The communication unit 150 refers to the TIM field of the beacon. If the communication unit 150 recognizes that no data to the communication apparatus 100 has been buffered in the AP, it transits to the Doze state. In the following description, a case in which the TIM field indicates that there is no data to the communication apparatus 100 in the AP will be represented as "TIM field is OFF", and a case in which the TIM field indicates that there is data to the communication apparatus 100 in the AP will be represented as "TIM field is ON".

At the next beacon reception timing, the communication unit 150 transits to the Awake state again to receive a beacon from the AP (S202). If the TIM field of the beacon is ON, the operating state keeping unit 151 starts to count the keep period Tm for determining a lapse of it, and keeps the Awake state of the communication unit 150 until the keep period Tm elapses. Note that the operating state keeping unit 151 calculates the keep period Tm corresponding to the predetermined percentage of the beacon cycle.

If the TIM field is ON, the communication unit 150 transmits, to the AP, a request (PS-Poll) to transmit data to the communication apparatus 100 (S203), and receives the data from the AP (S204). After that, if the keep period Tm elapses, the operating state keeping unit 151 cancels keeping of the Awake state of the communication unit 150, and the communication unit 150 transits to the Doze state. At the next beacon reception timing, the communication unit 150 transits to the Awake state again to receive a beacon from the AP (S205).

The operating state keeping unit 151 may start to count the keep period at a data transmission request (PS-Poll) transmission timing. If the predetermined percentage of the beacon period is shorter than a predetermined time (for example, 20 ms), the operating state keeping unit 151 may count a time to keep the Awake state of the communication unit 150 for a predetermined period equal to or longer than the predetermined time, instead of counting the keep period Tm. Although the default values of the predetermined percentage, predetermined time, and predetermined period are stored in the storage unit 140 in advance, the user can change them via the input unit 110.

Figure 4:
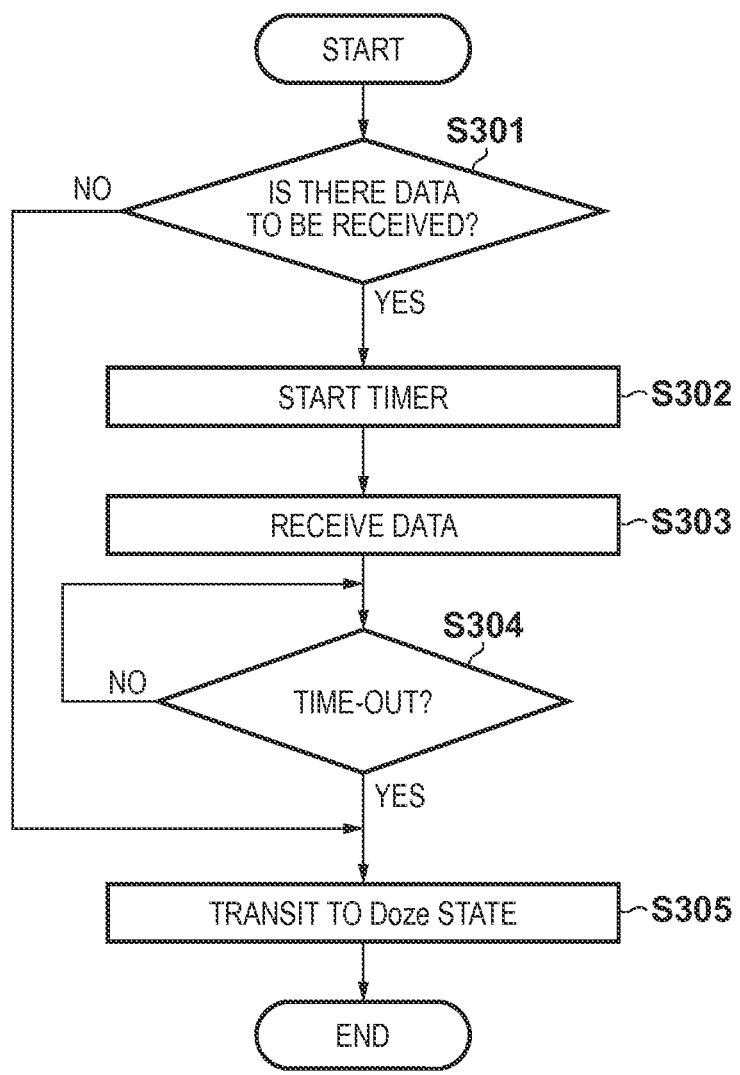
FIG. 4 is a flowchart for explaining processing by a communication unit when the Awake state is kept during a keep period.

Processing by the communication unit 150 when the Awake state is kept during the keep period will be described with reference to a flowchart shown in FIG. 4. Note that after the communication apparatus 100 connects the network and transits to the power saving mode, the communication unit 150 executes processing shown in FIG. 4 every time a beacon is received.

Upon receiving a beacon, the communication unit 150 determines whether the TIM field of the beacon is ON (S301).

If the TIM field is OFF, that is, there is no data to be received, the communication unit 150 transits to the Doze state (S305).

On the other hand, if the TIM field is ON, that is, there is data to be received, the operating state keeping unit 151 starts a timer to count the keep period Tm or predetermined period, and keeps the Awake state of the communication unit 150 (S302). The communication unit 150 transmits PS-Poll to the AP, and receives the data to the communication apparatus 100 (S303).

The operating state keeping unit 151 then determines whether the keep period Tm or predetermined period has elapsed (S304). During the keep period Tm or predetermined period, if data to be received arrives at the AP, the communication unit 150 receives the data, and if there is data to be transmitted, the communication unit 150 transmits the transmission data to the AP. If the keep period Tm or predetermined period elapses, the operating state keeping unit 151 cancels keeping of the Awake state of the communication unit 150, and the communication unit 150 transits to the Doze state (S305).

Case in which Awake State is Kept after Keep Period Elapses

Figure 5:
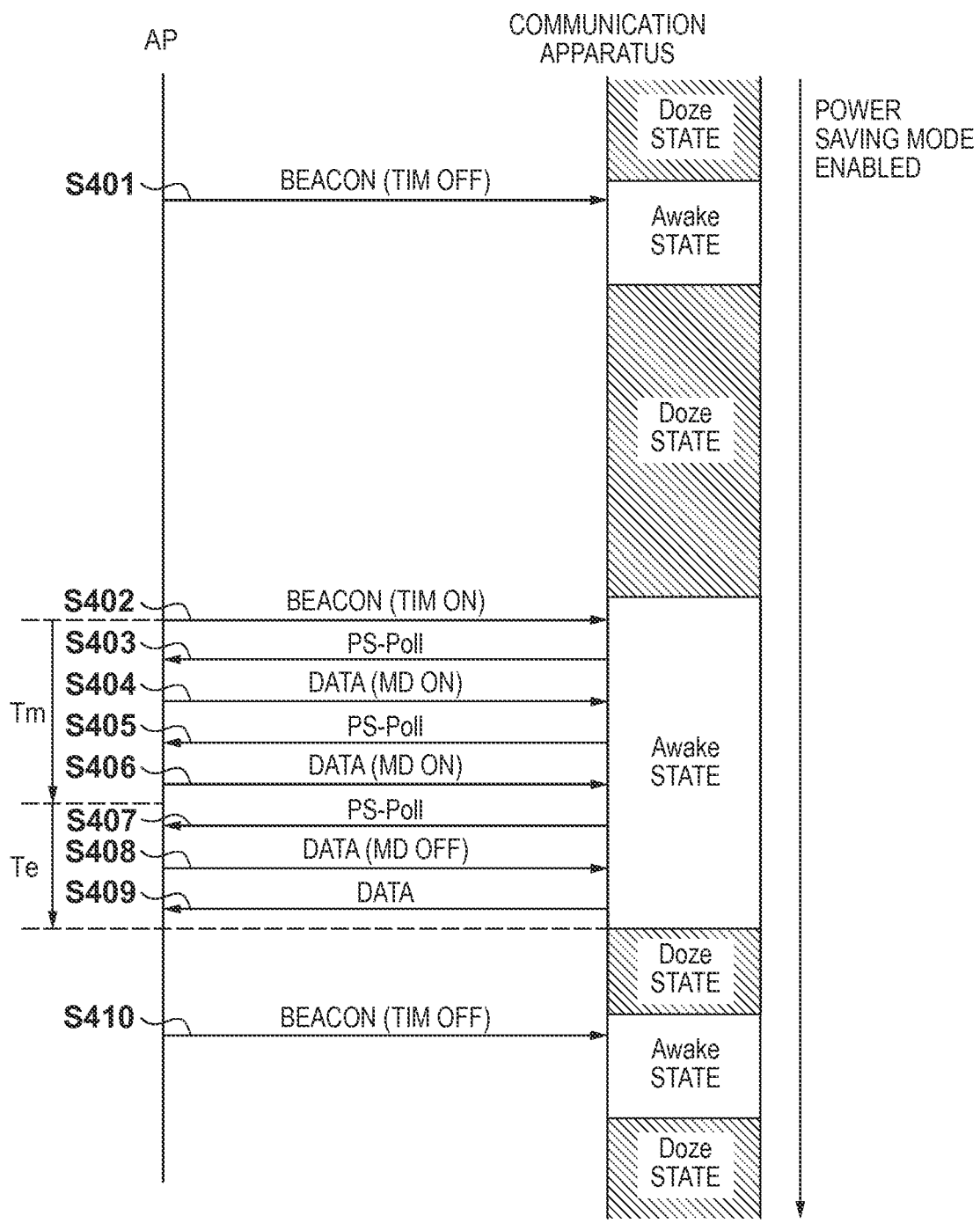
FIG. 5 is a sequence chart showing an example of a communication sequence by the communication apparatus in the infrastructure mode.

FIG. 5 shows an example of a communication sequence by the communication apparatus 100 in the infrastructure mode when the partner apparatus serves as an AP. Note that FIG. 5 shows an operation in which after the communication apparatus 100 connects a network formed by the AP, and transits to the power saving mode, the Awake state is kept in receiving data after the keep period Tm or predetermined period elapses.

The communication unit 150 of the communication apparatus 100 operating in the power saving mode periodically transits to the Awake state at a beacon reception timing, and receives a beacon from the AP via the antenna 160 (S401). If the TIM field of the beacon is OFF, the communication unit 150 transits to the Doze state.

At the next beacon reception timing, the communication unit 150 transits to the Awake state again to receive a beacon from the AP (S402). If the TIM field of the beacon is ON, the operating state keeping unit 151 starts to count the keep period Tm (or predetermined period) for determining a lapse of it, and keeps the Awake state of the communication unit 150 until the keep period Tm elapses. Note that counting may start at a PS-Poll transmission timing.

If the TIM field is ON, the communication unit 150 transmits, to the AP, a request (PS-Poll) to transmit data to the communication apparatus 100 (S403), and receives the data from the AP (S404).

As defined by the IEEE802.11 specification, the received data includes an MD (more data) field indicating whether further data to be received by the communication apparatus 100 has been buffered in the AP. The communication unit 150 refers to the MD field of the received data, and recognizes that data (to be referred to as "continuous data" hereinafter) to be continuously received by the communication apparatus 100 has been buffered in the AP. In the following description, a case in which the MD field indicates that there is continuous data in the AP will be represented as "MD field is ON", and a case in which the MD field indicates that there is no continuous data in the AP will be represented as "MD field is OFF". Note that an example in which the presence/absence of continuous data is determined by referring to the MD field has been described above. It may be determined that there is no continuous data if no data has been received for a predetermined period.

If there is continuous data, the communication unit 150 transmits a continuous data transmission request (PS-Poll) to the AP (S405), and receives the continuous data from the AP (S406). In the example shown in FIG. 5, after the data is received (S406), the keep period Tm elapses. Since, however, the MD field of the data received in step S406 is ON, the communication unit 150 recognizes that there is continuous data, and the operating state keeping unit 151 keeps the Awake state.

To receive the continuous data, the communication unit 150 transmits a continuous data transmission request (PS-Poll) to the AP (S407), and receives the continuous data from the AP (S408). In the example shown in FIG. 5, since the MD field of the data received in step S408 is OFF but there is data to be transmitted from the communication unit 150 to the AP, the operating state keeping unit 151 keeps the Awake state, and the communication unit 150 transmits the transmission data to the AP (S409).

After that, since there is no data to be transmitted/received by the communication unit 150, and the keep period Tm has elapsed, the operating state keeping unit 151 cancels keeping of the Awake state of the communication unit 150, and the communication unit 150 transits to the Doze state. That is, after the Awake state of the communication unit 150 is kept for an excessive period Te after the keep period Tm elapses, the communication unit 150 transits to the Doze state. At the next beacon reception timing, the communication unit 150 transits to the Awake state again to receive a beacon from the AP (S410).

Figure 6:
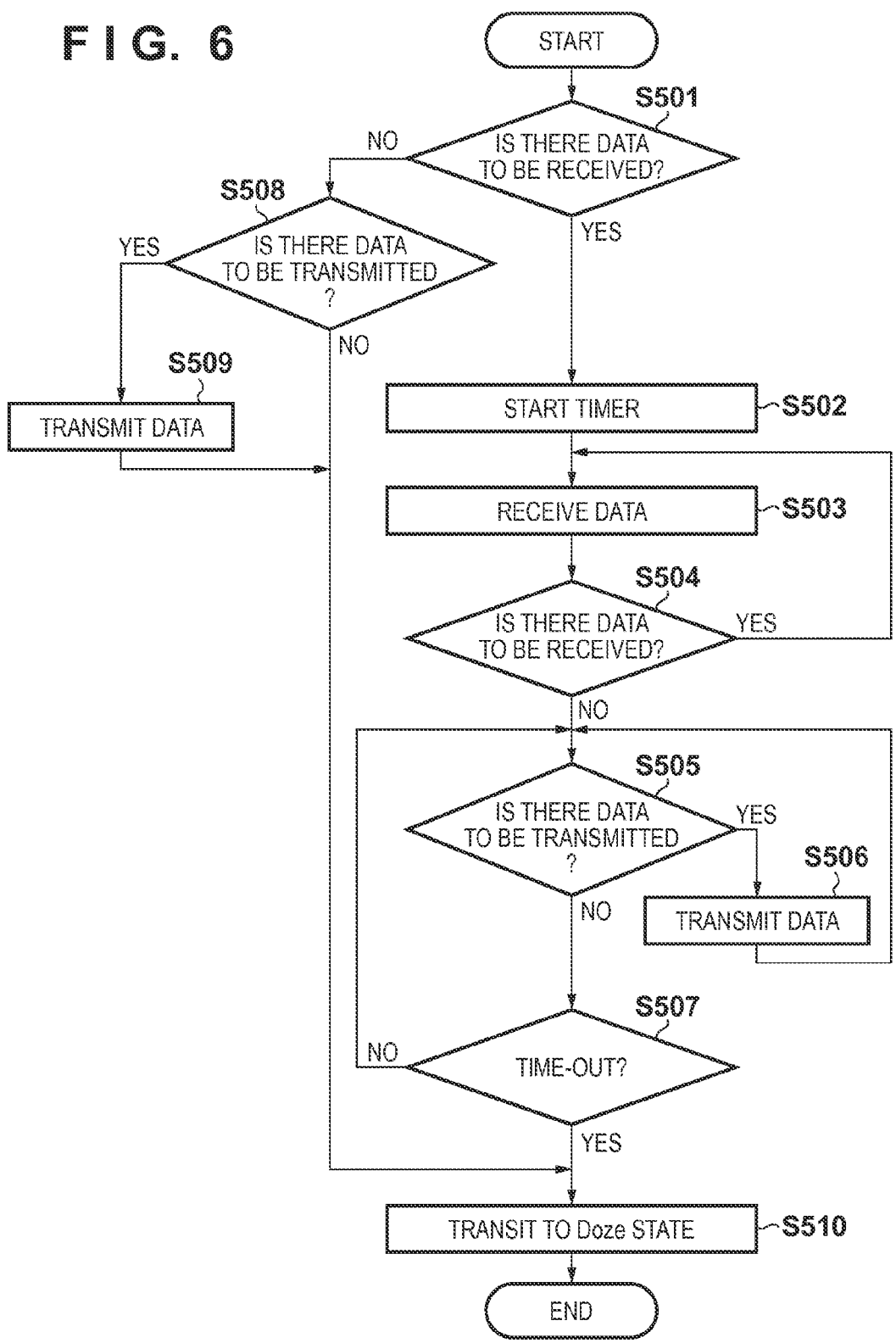
FIG. 6 is a flowchart for explaining processing by the communication unit when the Awake state is kept after the keep period elapses.

Processing by the communication unit 150 when the Awake state is kept after the keep period elapses will be described with reference to a flowchart shown in FIG. 6. Note that after the communication apparatus 100 connects the network, and transits to the power saving mode, the communication unit 150 executes processing shown in FIG. 6 every time a beacon is received.

Upon receiving a beacon, the communication unit 150 determines whether the TIM field of the beacon is ON (S501). If the TIM field is OFF, that is, there is no data to be received, the communication unit 150 determines whether there is data to be transmitted to the AP (S508). If there is data to be transmitted, the communication unit 150 transmits the transmission data to the AP (S509). The communication unit 150 then transits to the Doze state (S510).

On the other hand, if the TIM field is ON, that is, there is data to be received, the operating state keeping unit 151 starts a timer to count the keep period Tm (or predetermined period), and keeps the Awake state of the communication unit 150 (S502). The communication unit 150 transmits PS-Poll to the AP, and receives the data to the communication apparatus 100 (S503).

The communication unit 150 refers to the MD field of the received data, and determines whether there is continuous data (S504). If there is continuous data, the communication unit 150 repeats an operation of transmitting PS-Poll to the AP and receiving the continuous data (S503) until there is no longer continuous data.

If there is no or no longer continuous data, the communication unit 150 determines whether there is data to be transmitted to the AP (S505). If there is data to be transmitted, the communication unit 150 transmits the transmission data to the AP (S506). Note that even if there is no or no longer continuous data, the AP may transmit data to the communication apparatus 100 while the communication unit 150 transmits data. In this case, the communication unit 150 receives the transmitted data.

If there is no or no longer data to be transmitted, the operating state keeping unit 151 determines whether the keep period Tm has elapsed (S507). If the keep period Tm has not elapsed, the process returns to step S505, and the communication unit 150 transmits/receives data, as needed.

If the communication unit 150 no longer transmits/receives data, and the keep period Tm has elapsed, the operating state keeping unit 151 cancels keeping of the Awake state of the communication unit 150, and the communication unit 150 transits to the Doze state (S510). Note that if, as a result of data transmission/reception, there is only a time shorter than the predetermined period until a next beacon reception timing, the communication unit 150 may receive the next beacon without transiting to the Doze state.

A case in which the Awake state of the communication unit 150 is kept, and PS-Poll is transmitted to request data of the AP has been described above. The AP may be notified of a request by the communication apparatus 100 or the state of the communication apparatus 100 using a packet or another field such as a PM (power management) field defined by the IEEE802.11 specification.

As described above, if a beacon with the TIM field "ON" is received, the Awake state of the communication unit 150 is kept for at least the keep period or predetermined period corresponding to the predetermined percentage of the beacon cycle. With this operation, the Awake state is appropriately kept according to the beacon cycle of each AP during a period in which transmission/reception processing such as reception of data buffered in the AP tends to concentrate, thereby enabling prevention of data loss. Furthermore, it is possible to obtain an effect of preventing data loss in an AP with a low throughput, which requires a time from when a data transmission request is transmitted to the AP until data is received.

If the AP receives data destined for the communication apparatus 100 from another apparatus after the communication unit 150 receives data with the MD field "OFF", the AP may transmit the received data to the communication apparatus 100. It is also possible to prevent a data loss in this situation. Moreover, if there is data to be transmitted/received, the Awake state is kept, thereby enabling suppression of decrease in throughput when transmission/reception traffic continues.

If, in the keep period, the operating state is maintained regardless of the enable/disable reception of the communication apparatus 100, power-saving effect is reduced. In the embodiment, when it is the communication apparatus 100 capable of receiving data indicated by the control information, the Awake state is maintained in the keep period. In contrast, when it is the communication apparatus 100 incapable of receiving data indicated by the control information, the state of the communication apparatus 100 is immediately transited from the Awake state to the Doze state (standard specification). Accordingly, the power consumption of the communication apparatus 100 is effectively suppressed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-125146 filed May 31, 2012 which is hereby incorporated by reference herein in its entirety.

What is claimed is:

1. A communication apparatus comprising:
    a communication unit configured to wirelessly communicate with another communication apparatus in an awake state, and not to wirelessly communicate with the other communication apparatus in a doze state; and
    a determination unit configured to determine a keep period corresponding to a predetermined percentage of a transmission cycle of a beacon signal transmitted by the other communication apparatus, the keep period indicating a period to keep the awake state in one transmission cycle of the beacon signal,
    wherein (a) the communication unit transits from the doze state to the awake state in accordance with reception timing of the beacon signal, (b) the awake state of the communication unit is kept for the determined keep period, and (c) if the determined keep period elapses, the communication unit transits from the awake state to the doze state.

2. The apparatus according to claim 1, wherein, in a case where the beacon signal indicates that there is data to the communication apparatus in the other communication apparatus, the awake state of the communication unit is kept for the determined keep period, otherwise the communication unit transits from the awake state to the doze state before the determined keep period elapses.

3. The apparatus according to claim 1, wherein, in a case where the beacon signal indicates that there is no data to the communication apparatus in the other communication apparatus the communication unit transits from the awake state to the doze state regardless the determined keep period.

4. The apparatus according to claim 1, wherein the communication apparatus acquires information indicating the transmission cycle of the beacon signal from the beacon signal received from the other communication apparatus or a probe response signal of the other communication apparatus to a probe request signal.

5. The apparatus according to claim 1, wherein, in a case where the beacon signal indicates that there is data to the communication apparatus in the other communication apparatus, the communication unit requests the other communication apparatus to transmit data, and even after the determined keep period elapses, the awake state of the communication unit is kept until reception of data to be received from the other communication apparatus is completed.

6. The apparatus according to claim 1, wherein, in a case where the communication unit transmits data to the other communication apparatus in the awake state, and even after the determined keep period elapses, the awake state of the communication unit is kept until transmission of data to be transmitted to the other communication apparatus is completed.

7. The apparatus according to claim 1, wherein, in a case where the determined keep period is shorter than a predetermined time, the awake state of the communication unit is kept for a period equal to or longer than the predetermined time after receiving the beacon signal, and then the communication unit transits from the awake state to the doze state.

8. A control method of a communication apparatus comprising a communication unit which performs wireless communication with another communication apparatus in an awake state and does not perform the wireless communication in a doze state, the method comprising steps of:
- determining a keep period corresponding to a predetermined percentage of transmission cycle of a beacon signal transmitted by the other communication apparatus, the keep period indicating a period to keep the awake state in one transmission cycle of the beacon signal;
- transiting from the doze state of the communication unit to the awake state of the communication unit in accordance with reception timing of the beacons signal;
- keeping the awake state of the communication unit for the determined keep period; and
  - transiting, it the determined keep period elapses, from the awake state of the communication unit to the doze state of the communication unit.

9. A non-transitory computer readable medium storing computer-executable program for causing a computer to perform a control method of a communication apparatus comprising a communication unit which performs wireless communication with another communication apparatus in an awake state and does not perform the wireless communication in a doze state, the method comprising steps of:
- determining a keep period corresponding to a predetermined percentage of a transmission cycle of a beacon signal transmitted by the other communication apparatus, the keep period indicating a period to keep the awake state in one transmission cycle of the beacon signal;
- transiting from the doze state of the communication unit to the awake state of the communication unit in accordance with reception timing of the beacons signal;
- keeping the awake state of the communication unit for the determined keep period; and
- transiting, if the determined keep period elapses, from the awake state of the communication unit to the doze state of the communication unit.

* * * * *